(12) United States Patent
Seemüller et al.

(10) Patent No.: US 11,840,169 B2
(45) Date of Patent: Dec. 12, 2023

(54) STORAGE ARRANGEMENT

(71) Applicant: Jungheinrich Aktiengesellschaft, Hamburg (DE)

(72) Inventors: Stefan Seemüller, Unterschleißheim (DE); Lars Leiking, Erding (DE); Holger Cremer, Düsseldorf (DE); Anatolij Alberg, Pfungstadt (DE); Jörg Cavelius, Bad Vilbel (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 31 days.

(21) Appl. No.: 17/684,740

(22) Filed: Mar. 2, 2022

(65) Prior Publication Data

US 2022/0281372 A1    Sep. 8, 2022

(30) Foreign Application Priority Data

Mar. 3, 2021   (EP) .................................... 21160556

(51) Int. Cl.
| | |
|---|---|
| *B60P 3/00* | (2006.01) |
| *B60P 1/64* | (2006.01) |
| *B60P 1/54* | (2006.01) |
| *B65G 1/10* | (2006.01) |
| *B66C 1/66* | (2006.01) |

(52) U.S. Cl.
CPC .............. *B60P 3/007* (2013.01); *B60P 1/5442* (2013.01); *B60P 1/6427* (2013.01); *B60P 1/6436* (2013.01); *B65G 1/10* (2013.01); *B66C 1/66* (2013.01); *B60P 1/5409* (2013.01)

(58) Field of Classification Search
CPC ..... B60P 1/5442; B60P 1/6427; B60P 1/6436; B60P 3/007; B65G 1/0464; B65G 1/10; B65G 1/133; B65G 67/20; B66C 1/66
USPC ........................... 414/331.03, 542, 626, 679
See application file for complete search history.

(56) References Cited

U.S. PATENT DOCUMENTS

| | | | | |
|---|---|---|---|---|
| 3,572,513 | A * | 3/1971 | Tantlinger | B60P 1/5442 212/73 |
| 4,568,233 | A * | 2/1986 | Baker | B65G 1/0464 414/561 |
| 5,062,760 | A * | 11/1991 | Samaniego | B66C 17/00 212/348 |
| 5,391,042 | A * | 2/1995 | Song | B60S 9/12 212/245 |
| 5,743,702 | A * | 4/1998 | Gunderson | B60P 1/5442 224/403 |
| 8,622,682 | B2 * | 1/2014 | Murata | H01L 21/67769 414/940 |

(Continued)

FOREIGN PATENT DOCUMENTS

| | | |
|---|---|---|
| DE | 10 2006 025 876 | 12/2007 |
| DE | 10 2016 010 288 | 4/2017 |
| DE | 10 2018 105 778 | 9/2019 |

*Primary Examiner* — James Keenan
(74) *Attorney, Agent, or Firm* — GREENBLUM & BERNSTEIN, P.L.C.

(57) ABSTRACT

A storage arrangement that includes a rack receiving space; and a movement space. The rack receiving space includes at least One movable rack and the movement space may contain a movement device that interacts with the at least one rack. The movement space is arranged above the rack receiving space in a direction of gravity, and the movement device is releasably engaged with the at least one rack.

14 Claims, 5 Drawing Sheets

(56) References Cited

U.S. PATENT DOCUMENTS

| | | | |
|---|---|---|---|
| 11,078,016 B2* | 8/2021 | Kim | B07C 5/00 |
| 2006/0013674 A1* | 1/2006 | Elliott | H01L 21/67775 |
| | | | 414/940 |
| 2017/0291766 A1* | 10/2017 | Orth | B65G 1/1378 |
| 2020/0074404 A1* | 3/2020 | Gil, Jr. | B64C 39/024 |
| 2021/0387808 A1* | 12/2021 | Kalouche | G06Q 10/083 |
| 2022/0129833 A1* | 4/2022 | Gil | G06Q 10/083 |

* cited by examiner

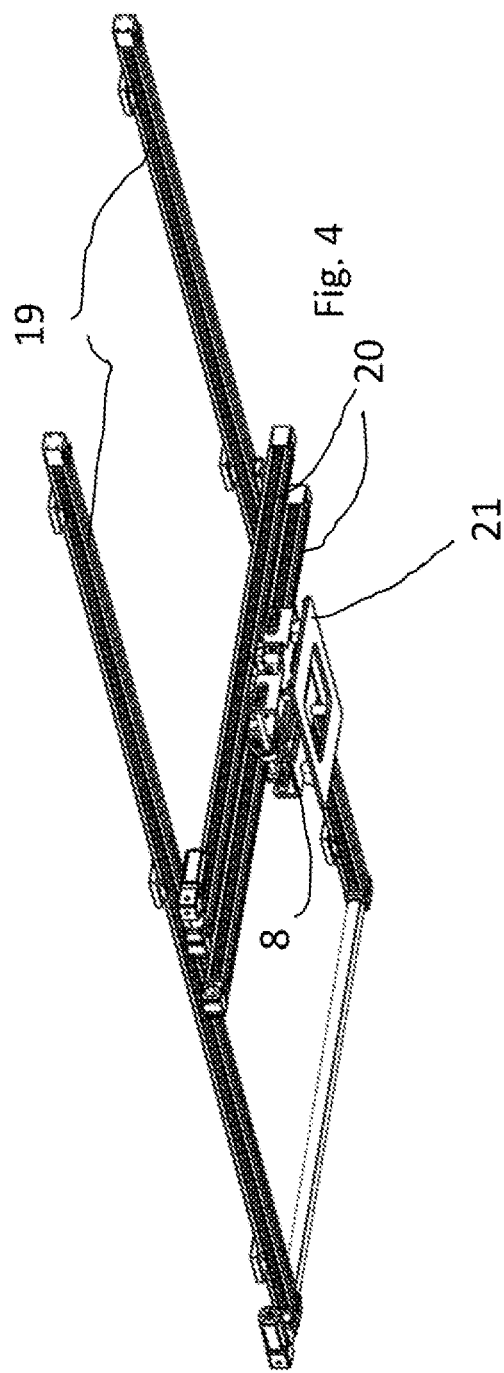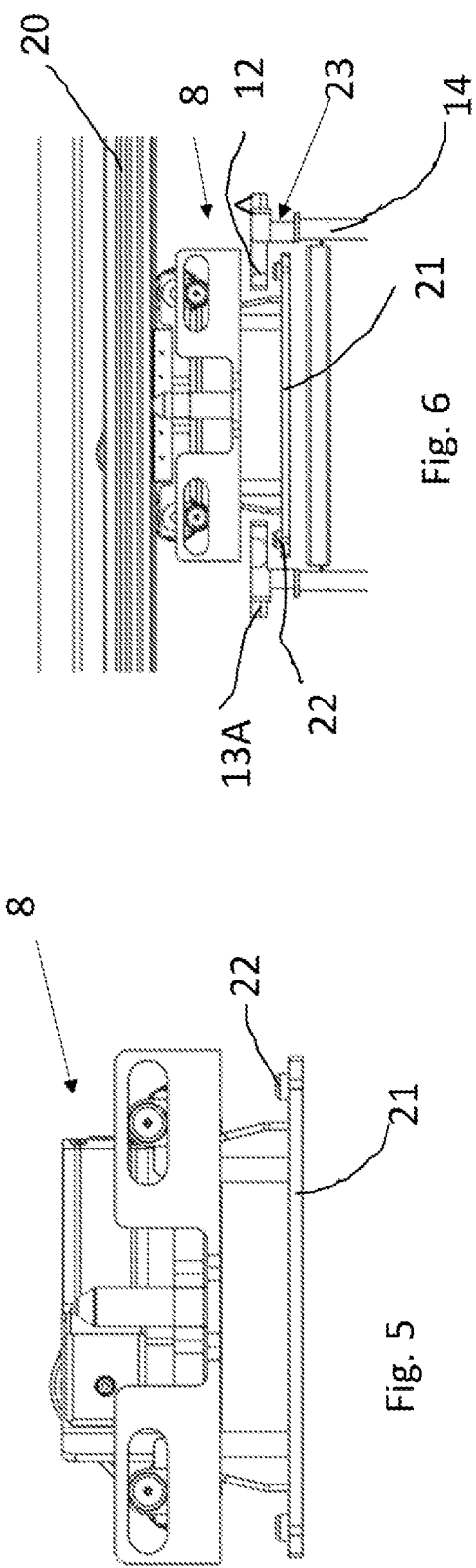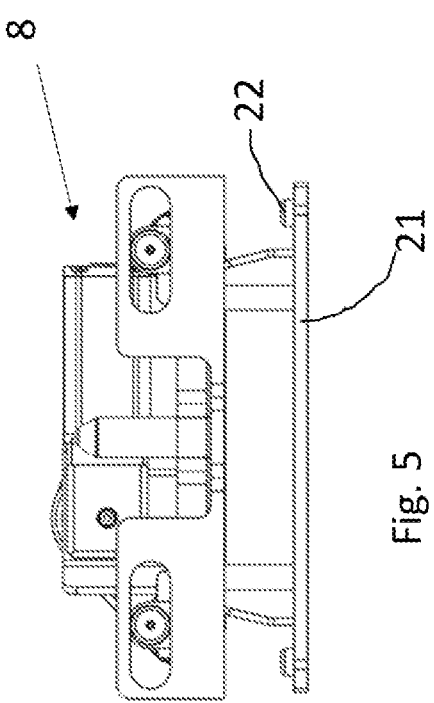

STORAGE ARRANGEMENT

CROSS-REFERENCE TO RELATED APPLICATION

The present application claims priority under 35 U.S.C. § 119(a) of Europe Patent Application No. 211 60 556.3 filed Mar. 3, 2021, the disclosure of which is expressly incorporated by reference herein in its entirety.

BACKGROUND

1. Field of the Invention

The present invention relates to a storage arrangement with a rack receiving space and a movement space. The rack receiving space includes at least one movable rack and the movement space contains a movement device which interacts with the at least one rack. The movement space is arranged above the rack receiving space in the direction of gravity.

2. Discussion of Background Information

DE 10 2016 010 288 A1 and DE 10 2018 105 778 B4 describe storage arrangements in which racks are moved by transport vehicles, wherein the transport vehicles travel on the ground and thus lift the racks from below.

DE 10 2006 025 876 A1 describes a container which houses a power-operated storage system, the load receiving means of which are embodied from multiple racks that are connected to one another via at least one drive train and each have multiple shelves arranged one above the other which circulate horizontally. This arrangement concerns racks that are connected to one another in a circulating manner.

In order for it to be possible to move racks of the arrangements described above, the racks must be moved by transport vehicles, wherein the transport vehicles must reach under the rack in order lift the rack. An elaborate programming, control, and positioning of the transport vehicles is necessary for this purpose, so that the respective transport vehicle can assume a suitable position for lifting the rack without said rack falling over. Furthermore, the ground must always be free of objects, since the transport vehicles which are loaded with a rack, could begin to tip if they run over such objects, wherein the loaded rack can fall over. In this case, not only are objects problematic, but also media such as oils, water, refrigerant, or the like. If a transport vehicle gets onto media of this type, the traction between the drive of the transport vehicle and the ground is reduced, so that the rack cannot be securely transported.

Though the solution of the circulating rack described in DE 10 2006 025 876 A1 does avoid the difficulties with the transport vehicles, objects must be manually placed into storage in the permanently installed circulating racks, which is both time- and labor-intensive.

SUMMARY

Embodiments are directed to a storage arrangement that achieves a secure and flexible transport of racks. In particular, the storage arrangement includes a rack receiving space and a movement space, in which the rack receiving space includes at least one movable rack, and the movement space contains a movement device which interacts with the at least one rack. The movement space is arranged above the rack receiving space in the direction of gravity and the movement device is releasably engaged with the at least one rack.

The storage arrangement of the type named at the outset is characterized in that the movement device is releasably engaged with the at least one rack. In this manner, the movement device, which is arranged in a movement space above the rack receiving space, can interact with the rack, wherein this interaction is carried out in the rack receiving space and in the movement space. The interaction involves the receiving, moving, and setting down of the rack by the movement device. This has the advantage that messes on the subsurface, such as objects that have fallen out of the racks or liquids such as oil, water or the like, for example, are passed over so that such soiling of the subsurface has no effect on the transport or a movement of the racks. Furthermore, the movement device interacts with the rack in an upper region of the rack, for example, so that the rack cannot fall over.

In one exemplary embodiment, the rack receiving space is equipped with racks through an opening, wherein a rack is transferred, for example, to a transfer position inside of a rack receiving space, so that the movement device transfers the rack into the rack receiving space from this transfer position. A rack can furthermore be removed from the rack receiving space via the transfer position. Thus, in this exemplary embodiment, racks can be loaded outside of the rack receiving space in order to subsequently transfer the racks into the rack receiving space.

In another exemplary embodiment, the movement device moves the racks within the receiving space, wherein the racks can be organized according to a predetermined sorting. The movement device thereby moves one single rack at a time, so that the sorting of the racks is carried out iteratively. This sorting is carried out, for example, with what is referred to as a sliding puzzle principle, or sliding storage principle, wherein in said principle the maximum number of racks located in the rack receiving space corresponds to the maximum capacity minus one or more racks. In this exemplary embodiment, this means that one or more rack spots are kept free. To sort the racks, a rack that is adjacent to the free rack spot is moved into said spot. This results in a new free rack spot, into which another rack can be moved, for example. This enables a sorting with the greatest possible space utilization of the rack receiving space.

In another alternative embodiment, all rack holding spots of the rack receiving space are occupied with racks so that a maximum degree of loading of the rack receiving space is achieved.

Because the movement device is releasably arranged with a rack, the movement device can, in order to move the rack, engage with said rack. Once the movement of the rack by the movement device is complete, the movement device releases from the rack, so that the movement device can be freely moved, for example in order to interact with a different rack. As a result, the movement device can interact with different racks. A high flexibility is thus obtained.

The movement device preferably comprises a positively guided lifting unit that can be moved along two movement axes arranged at an angle, preferably at essentially a right angle, to one another, wherein the lifting unit can be moved perpendicularly to the two movement axes. As a result of this arrangement, the lifting unit can be moved over each rack spot of a rack receiving space. The positive guidance makes it possible to know which position the lifting unit is located in at all times. Furthermore, the lifting unit is guided and can thus be moved free of slippage. The positive guidance can thereby comprise a positioning unit, for example. The angle of the movement axes can be adapted to the layout of the rack receiving space. For example, in a rectangular receiving space, the movement axes are arranged at a right angle to one another. "At a right angle" thereby essentially corresponds to a 90° angle.

The lifting unit, which can be moved perpendicularly to the two movement axes, permits a lifting of the at least one rack in a lifting direction, wherein the lifting direction is preferably arranged against the direction of gravity. To set down the rack, the lifting unit moves the rack downward in the direction of gravity.

In one exemplary embodiment, the lifting path of the lifting unit can be limited to a defined length, so that the lifting unit can have accordingly large or small dimensions. This allows a lightweight lifting unit, as a result of which the costs can be minimized.

The at least one rack preferably includes a receiving geometry which releasably interacts with a lifting geometry of the lifting unit of the movement device. In order to move the rack, the receiving geometry and the lifting geometry of the lifting unit are brought into engagement. As a result of this engagement, the movement device interacts with the rack. The engagement is thereby achieved through a movement of the movement device, in particular of the lifting geometry of the lifting unit. With this arrangement, the costs are minimized since additional actuators can be omitted.

In one exemplary embodiment, the receiving geometry and the lifting geometry interact with one another through a positive, non-positive, or frictional engagement that is temporary. This means that it can be formed and severed. For this purpose, a positive engagement with the receiving geometry of the rack is achieved by a movement of the movement device, in particular of the lifting geometry of the lifting unit. Once the positive engagement has been produced, the rack can be moved. The positive engagement can also be severed again by a movement of the movement device, in particular the lifting geometry of the lifting unit. The positive engagement allows a secure transport of the racks since, as a result of the positive engagement, a relative shifting between the receiving geometry and the lifting geometry is avoided.

Preferably, the lifting geometry can be moved beneath the and/or under the receiving geometry in the direction of gravity. This enables, through a lifting of the lifting geometry against the direction of gravity, a lifting of the rack by the receiving geometry attached thereto. The arrangement is thus kept simple, which further minimizes the costs.

Preferably, the lifting, geometry comprises a seeking geometry and the receiving geometry comprises a locating geometry. With the seeking geometry and the locating geometry, the lifting geometry is clearly positioned relative to the receiving, geometry. As a result, the rack can be set down in a defined position on the one hand, and the rack can be lifted and moved at defined receiving points of the receiving geometry due to this arrangement on the other hand. This enables a secure transport and a secure movement of the rack.

In one embodiment, the locating geometry of the receiving geometry is embodied as a funnel-shaped arrangement into which the seeking geometry can be guided. For this purpose, the seeking geometry is for example embodied as a mandrel, in particular with a tip. This enables a simple guiding of the seeking geometry into the locating geometry.

Preferably, the receiving geometry comprises a first securing, geometry arranged outwardly from the rack, which securing geometry is releasably engaged with a second securing geometry of a receiving geometry of an adjacent rack in a securing position. The securing position of a rack describes a position in which the securing geometry of a first rack is engaged with the securing geometry of a second rack. In this securing position, the securing geometries are releasably engaged. The engagement can be severed, for example, with a lifting movement of the rack by the lifting unit. In the securing position, the racks stabilize one another reciprocally, whereby an inadvertent tipping or falling-over of individual racks is avoided.

In one exemplary embodiment, the first securing geometry comprises a projection which is engaged with a recess of the second securing geometry in the securing position. For this purpose, the securing geometries are arranged externally on the respective receiving geometry. The projection and the recess of the respective securing geometry constitute simple, easy-to-manufacture manifestations that are cost-effective.

In a further embodiment, the releasable engagement of the first securing geometry is realized with the second geometry through a dovetail-shaped connection. In this manner, a stable locking, in multiple spatial directions, of the adjacent racks is enabled in the securing position.

Preferably, at least a boundary of the rack receiving space comprises at least one holding geometry that interacts with a securing geometry of the at least one rack. A boundary of the rack receiving space can be embodied, for example, by a wall, a fence, a door, or the like. The rack receiving space is arranged within this boundary. On the side of the boundary that faces in the direction of the rack receiving space, at least one holding geometry is arranged which temporarily interacts with a securing geometry of the at least one rack. The holding geometry is thereby adapted to the securing geometry. As a result, the at least one rack is secured against falling over or a movement in relation to the boundary of the rack receiving space. This arrangement prevents an unwanted movement of the rack. Furthermore, the position of said rack is defined by this arrangement. This simplifies the organization and the handling of the racks. Because of the securing of the rack on the holding geometry of the boundary by the securing geometry, it is furthermore prevented that said rack shifts and thus interferes with the movement of another rack by the movement device.

Preferably, in a lifting position in which the rack has been lifted by the lifting unit, the securing geometry of a first rack can be moved past the securing geometry and/or receiving geometry of a second rack in a securing position. The second rack is thus located in a securing position described above, while the first rack has been lifted by the lifting unit and is thus located in a lifting position.

For this purpose, in one embodiment columns of the racks comprise a notch beneath the receiving geometry and/or securing geometry, wherein the notch extends from the outside in the direction of the respective adjacent column and/or in the direction of the middle of the rack.

In a further exemplary embodiment, the lifting position of the first rack is determined by a limited lifting height. In this manner, the recess, such as the one described for example, can be limited at the rack or the securing geometry and/or receiving geometry thereof in the direction of gravity. As a result of this arrangement, the first rack, which is arranged in a lifting position, can be moved past the second rack without portions of the securing geometry/receiving geometry of the second rack impeding the movement of the first rack.

Preferably, the at least one rack has a rectangular layout with a length direction and a width direction, wherein a column is provided in each corner region, with the receiving geometry being arranged on at least one column in an upper region thereof in the direction of gravity. The length direction and the width direction each extend perpendicular to the extension direction of a column. The length direction and the width direction are thereby arranged perpendicularly to one another. Through the arrangement of the receiving geometry in an upper region of the column, it becomes possible for the lifting device or the lifting geometry to interact with said receiving geometry. Because the receiving geometry is arranged on the upper region, a falling-over of the rack in a lifting position is avoided.

For example, rack shelves are arranged on the columns, which rack shelves are arranged spaced apart from one another in the direction of gravity. Stored goods can be arranged on these rack shelves, wherein the stored goods can be removed from the rack shelves and put down thereon.

Preferably, the receiving geometry extends in the length direction and/or in the width direction towards one of the adjacent columns, preferably in the length direction and width direction, particularly preferably essentially towards the middle of the rack. As a result of this arrangement, a portion of the receiving geometry protrudes along the length direction and/or width direction, in particular towards the interior of the rack. This permits an engagement of the lifting geometry in the receiving geometry. The receiving geometry thereby faces in the direction of at least one of the adjacent columns. Furthermore, this arrangement makes possible a projection that can be approached from below by the lifting geometry. This simple geometry is cost-effective.

Preferably, a portion of the lifting geometry overlaps a portion of the receiving geometry of the at least one rack in the lifting position. As a result of this arrangement, the lifting geometry can interact with the receiving geometry once a corresponding position of the movement device, in particular the lifting device and lifting geometry, relative to the rack has been reached. Furthermore, due to the overlap, the use of additional actuators, servomotors, or other controlling elements can be is avoided so that the arrangement can be realized with little effort.

Preferably, the lifting geometry can be moved between two adjacent columns of the at least one rack. As a result of this arrangement, the lifting geometry is located beneath the receiving geometries of racks that are arranged in a securing position. A lowering of the lifting geometry during the transfer of a rack from the securing position into a lifting position is thus avoided, since the lifting geometry is already arranged between the columns and beneath the receiving geometry and is thus appropriately positioned. As a result, the amount of time for transferring a rack from a securing position into a lifting position and vice versa can be reduced.

The floor of the rack receiving space preferably comprises at least one securing device for the at least one rack. Through this securing device, the rack can be secured against an unintended movement out of a securing position. This prevents a falling-over or a movement of the rack, whereby the secureness of the rack receiving space or the storage arrangement is increased.

In one exemplary embodiment, the securing device comprises an arrangement which prevents a shifting or movement of the rack perpendicular to the direction of gravity. The rack can be inserted into the securing device against the direction of gravity by the lifting unit, and can be removed from said securing device.

Preferably, the lifting unit can be moved on linear axes. With linear axes, which also comprise a measuring device, for example, the lifting unit can be moved in a defined manner. Furthermore, this enables a quick and easy design of the movement possibilities of the lifting unit. The development costs and manufacturing costs are thus minimized.

The storage arrangement is preferably mobile. This enables a use of the storage arrangement in different locations and under different circumstances. A high flexibility of the storage arrangement is thus obtained.

In one exemplary embodiment, the storage arrangement can be arranged in a container, for example, so that at a destination point the container or the racks can be unloaded in a corresponding order, wherein the unloading order can differ from the loading order. The racks are thereby moved and re-sorted accordingly by the movement device during transport. This reduces the removal time.

In a further exemplary embodiment, the storage arrangement can be arranged in a vehicle, in particular in a delivery vehicle. Racks with stored goods or transport goods can thus be placed into storage in the delivery vehicle prior to the start of a trip. The movement device transfers the racks from a transfer position into the rack receiving space via the racks and can be removed up until a defined rack position within the rack receiving space. While the delivery vehicle is en route to a destination, the racks are sorted such that the driver of the delivery vehicle can directly access the stored goods, transport goods or packaged goods, such as parcels, that are to be delivered. As a result of this, a time-intensive searching of the stored goods that are to be delivered is no longer required.

On the way to a next destination point, the racks are furthermore organized such that a corresponding parcel can be removed from a rack. For this purpose, the storage arrangement is arranged in a transport space of the delivery vehicle.

A service space is located inside of the transport space, which service space permits access to one or more rack spots within the rack receiving space. For delivery, the movement device places respective racks in these rack spots so that the driver can remove parcels from these racks. Here, a costly search of the stored goods by the driver is also no longer necessary.

In a further exemplary embodiment, a manual storage spot system is located in the transport space of the vehicle next to the storage arrangement. Bulky goods or other transport goods can be stowed in this manual storage spot system. The delivery vehicle can thus be used in a more flexible manner. To remove the racks from storage from the delivery vehicle, for example at the end of a trip, back at the transport center, the racks are moved to the transfer position by the movement device inside of the rack receiving space, wherein from this rack removal-from-storage position the rack can be manually removed from the rack receiving space by a driver or another position. This allows a quick removal of the racks from the delivery vehicle.

In another further exemplary embodiment, the racks comprise casters so that the racks can be rolled. This enables a manual movement of the racks outside of the rack receiving space, for example by people. A high flexibility is thus obtained.

Embodiments are directed to a storage arrangement that includes a rack receiving space; and a movement space. The rack receiving space includes at least one movable rack and the movement space may contain a movement device that interacts with the at least one rack. The movement space is arranged above the rack receiving space in a direction of gravity, and the movement device is releasably engaged with the at least one rack.

In embodiments, the movement device can include a positively guided lifting unit movable along two movement axes arranged at an angle to one another, and the lifting unit may be movable perpendicularly to the two movement axes. The two movement axes can be arranged at essentially right angles to each other. Further, the at least one rack may include a receiving geometry which releasably interacts with a lifting geometry of the lifting unit of the movement device. The lifting geometry can be movable beneath the receiving geometry in the direction of gravity. Still further, the lifting geometry can include a seeking geometry and the receiving geometry comprises a locating geometry. The receiving geometry may include a first securing geometry arranged outwardly from the rack, the first securing geometry being releasably engaged with a second securing geometry of a receiving geometry of an adjacent rack in a securing position. Moreover, at least a boundary of the rack receiving space can include at least one holding geometry that interacts with a securing geometry of the at least one rack. In a lifting position in Which the rack has been lifted by the lifting unit, a first securing geometry of the rack can be movable past at least one of a second securing geometry and a second receiving geometry of a second rack in a securing position. The at least one rack has a rectangular layout with a length direction and a width direction, in which a column is provided in each corner region, with the receiving geometry being arranged on at least one of the columns in an upper region thereof in the direction of gravity. The receiving geometry can extend in at least one of the length direction and the width direction towards an adjacent column. The receiving geometry may extend essentially towards a middle of the rack. A portion of the lifting geometry may overlap a portion of the receiving geometry of the at least one rack in the lifting position. The lifting geometry can be movable between two adjacent columns of the at least one rack in a securing position.

In accordance with other embodiments, the floor of the rack receiving space can include at least one securing device for the at least one rack.

According to other embodiments, the lifting unit may be movable on linear axes.

In accordance with still yet other embodiments, the storage arrangement can be mobile.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4 shows a schematic illustration of the movement device;

FIG. 5 shows a schematic side view of a lifting unit;

FIG. 6 shows a positioning of the lifting unit and the lifting geometry relative to a moving rack;

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
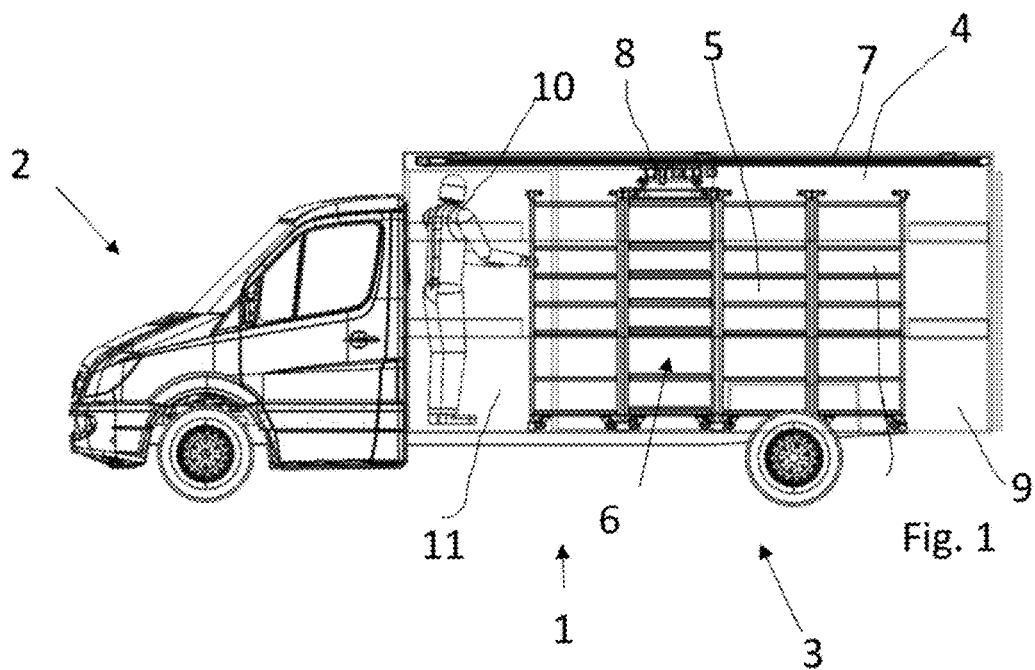
FIG. 1 shows a schematic illustration of a vehicle with a storage arrangement.

FIG. 1 shows a vehicle 1 with a driver's cab 2 and a transport space 3. A rack receiving space 5 and a movement space 4 are arranged in the transport space 3. Multiple racks 6 are arranged in the rack receiving space 5. In the movement space 4, a movement device 7 with a lifting unit 8 is provided. The transport space 3 furthermore comprises a manual storage spot system 9. A driver operates the vehicle 1 and the storage arrangement. In order for the driver 10 to be able to access the rack receiving space 5, a service space 11 is provided between the driver's cab 2 and the rack receiving space 5, from which service space 11 the driver 10 can access the rack receiving space 5 or the rack 6 located therein. The driver 10 can reach the service space 11 through a passage from the driver's cab 2, which passage is not illustrated. Furthermore, the service space 11 can comprise a door through which the driver 10 can reach the outside from the service space 11. This is likewise possible from the outside into the service space 11.

Figure 2:
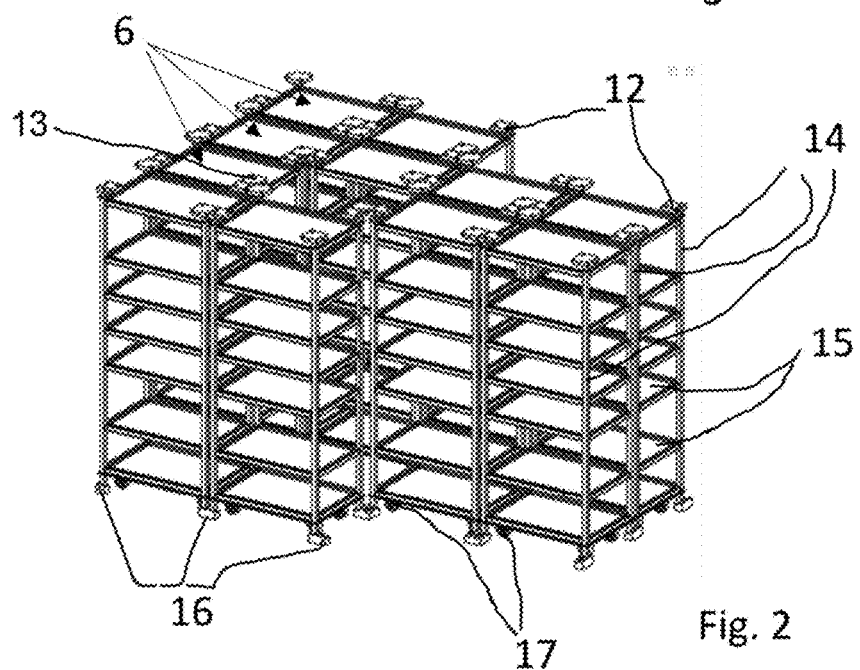
FIG. 2 shows an arrangement of racks.

FIG. 2 shows multiple racks 6 that are engaged with one another through securing geometries 13 arranged on receiving geometries 12. The racks comprise columns 14 on which rack compartments 15 are arranged. On an upper region of the columns 14, receiving geometries 12 with securing geometries 13 are arranged. Furthermore, the racks 6 are arranged in securing devices 16 arranged on the floor. The racks 6 furthermore comprise casters 17.

Figure 3:
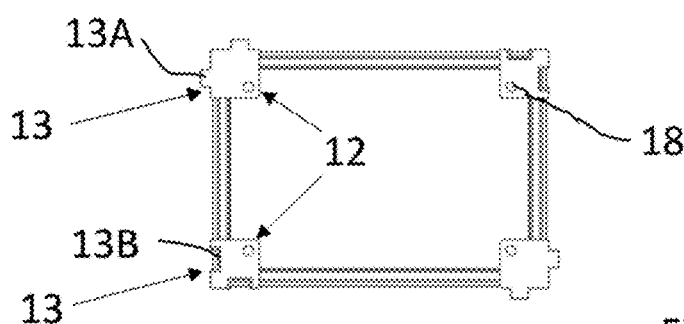
FIG. 3 shows a schematic top view of a rack.

FIG. 3 shows a top view of rack 6. In each corner region of the rack 6, receiving geometries 12 with securing geometries 13 are arranged. The receiving geometries 12 furthermore comprise a locating geometry 18. The locating geometry 18 is in this case embodied as a through hole.

The securing geometries 13 comprise two embodiments that can interact with one another. A first embodiment comprises the securing geometry 13 with a projection 13A which can be releasably engaged with a recess 13B of a second embodiment of the securing geometry 13. A securing geometry 13 can thereby comprise a projection 13A and a recess 13B.

FIG. 4 shows a movement device 7 with two first linear axes 19 and two second linear axes 20. The lifting unit 8 is arranged on the second linear axes 20. The lifting unit 8 furthermore comprises a lifting geometry 21 that can thereby be moved perpendicularly to the two linear axes 19, 20. Furthermore, the lifting unit 8 can be moved along the second linear axis 20, wherein the second linear axis 20 can be moved along the first linear axis 19. The first linear axis 19 is thereby arranged in the direction of travel of the vehicle 1, and the second linear axis 20 is arranged transversely to the direction of travel of the vehicle 1.

FIG. 5 shows the lifting unit 8 with the lifting geometry 21. A seeking geometry 22 is arranged on the lifting geometry 21. Through a lifting mechanism not illustrated, the lifting geometry 21 can be moved in the direction of gravity or perpendicularly to the first and second linear axis 19, 20.

FIG. 6 shows the lifting unit 8 with the lifting geometry 21, wherein the lifting geometry is arranged between columns 14 of a rack 6 beneath the receiving geometry 12. It can clearly be seen that the lifting geometry 21 partially overlaps the receiving geometry 12. To lift the rack 6, the lifting geometry is moved upwards in the direction of gravity, so that the lifting geometry 21 is engaged with the receiving geometry 12. The locating geometry 18, not illustrated in this Figure, thereby interacts with the seeking geometry 22 so that a positively engaged, releasable connection between the lifting geometry 21 and the receiving geometries 12 is present. The position in which the rack 6 has been raised by the lifting geometry 21 is hereinafter referred to as the lifting position.

Furthermore, a notch 23 on the columns 14 can be seen in FIG. 6. The notch 23 essentially describes an indent of the column 14, so that the two sides of the column 14 facing outward are inwardly offset by a certain distance. The notch 23 makes it possible for a rack 6 in the lifting position to be able to be moved past another rack 6 in a securing position. The securing position describes a position in which the rack 6 is not engaged with the lifting unit 8 or the lifting geometry 21, but rather the securing geometry 13 of the rack 6 is engaged with another securing geometry 13 of a second rack 6 and/or with a holding device, not illustrated, on a boundary, not illustrated, of the rack receiving space 5, and/or the rack 6 in a securing position is engaged with a securing device 16.

Furthermore, in FIG. 6, a pass-through position of the lifting unit 8 or the lifting geometry 21 is illustrated. The lifting geometry 21 can be moved in the direction of gravity beneath the receiving geometry 12, wherein the lifting geometry 21 is moved between the columns 14 of a rack 6.

The seeking geometry 22 and the locating geometry 18 are brought into engagement during the transfer of the rack 6 from the securing position into the lifting position. In the lifting positions, a positive engagement is thus present between the receiving geometries 12 of the rack 6 and the lifting geometry 21. Through the seeking geometry 22 and the locating geometry 18, a secure hooking-in of the lifting geometry 21 on the corresponding receiving geometries 12 is achieved. A shifting of the lifting geometry 21 relative to the corresponding receiving geometries 12 is thus prevented.

Figure 7A:
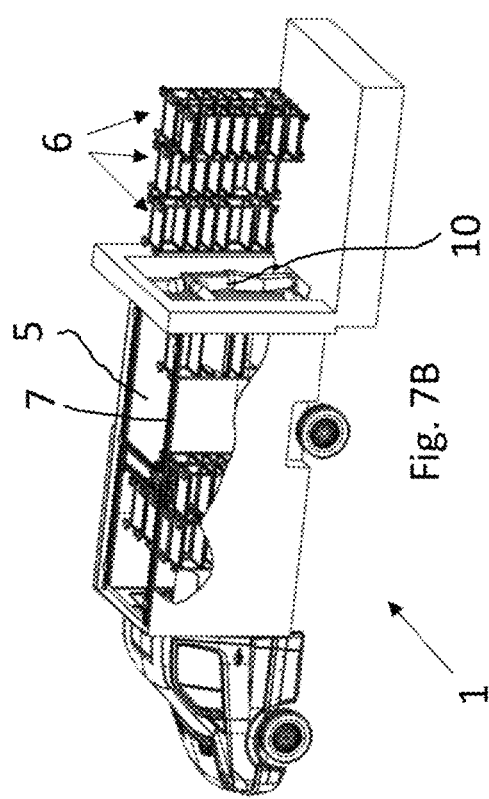
FIGS. 7A-7D show a placement-into-storage and removal-from-storage process of a rack in a delivery vehicle.
Figure 7B:
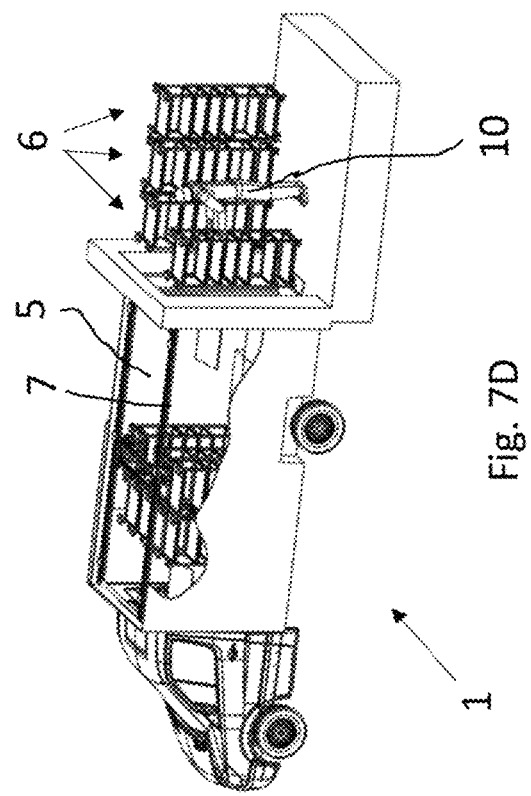
Figure 7C:
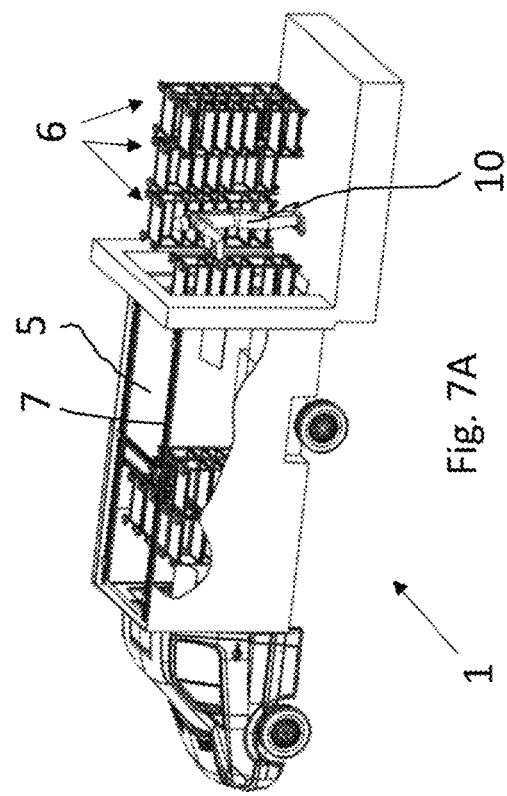
Figure 7D:
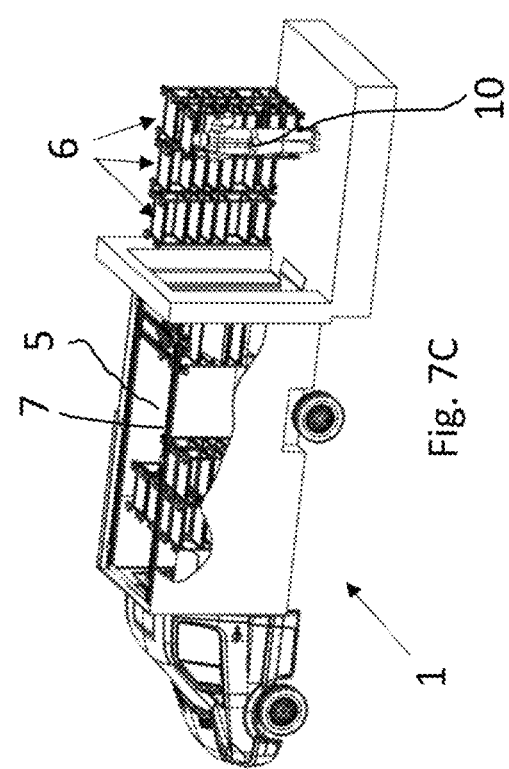

In FIGS. 7A-7D, a placement-into-storage process of a rack 6 in the rack receiving space is illustrated. In FIG. 7A, a rack 6 is moved into the rack receiving space 5 by the driver 10, for example. The driver 10 thereby positions the rack 6 in a transfer position in the rack receiving space 5, as is illustrated in FIG. 7B. FIG. 7C shows how the rack 6 is transferred from the transfer position into a designated rack spot. For this purpose, the movement device 7, in particular the lifting unit 8, interacts with the rack 6. The driver 10 can then, as illustrated in FIG. 7D, position another rack 6 in the transfer position. The cycle starts from the beginning.

To remove a rack 6 from storage from the rack receiving space 5, the rack 6 is positioned in the transfer position by the movement device 7, in particular the lifting unit 8. There, the rack 6 is released by the movement device 7 so that the driver 10 can remove the rack 6 from the rack receiving space 5.

Figure 8A:
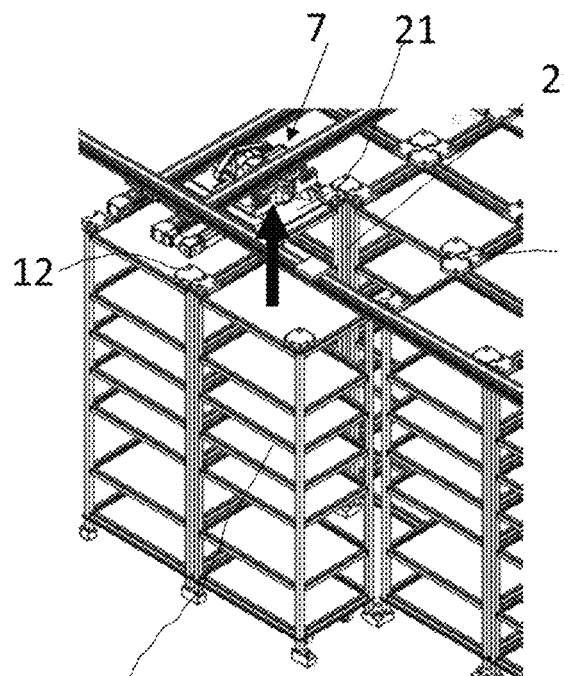
FIGS. 8A-8D show a schematically illustrated process of the sliding storage system.

In FIGS. 8A-8D, the principle of a sliding storage system is elucidated. The sliding storage system follows the same principle as a sliding puzzle. The rack receiving space 5 thereby comprises a certain number of rack spots. One rack 6 can be arranged in each rack receiving spot. In order for it to be possible to relocate or move the arranged racks 6, one rack spot must be kept free. Adjacent racks 6 can be moved into this rack spot. In this manner, the organization of the racks 6 within the rack receiving space 5 can be iteratively changed. For this purpose, the movement device 7 first moves the lifting geometry 21 into a position of a rack 6 that is arranged next to the free rack spot 26. The lifting device 8 then, in combination with the lifting geometry 21 and the receiving geometries 12, lifts the rack out of the securing position into the lifting position. This is illustrated in FIG. 8A.

Figure 8B:
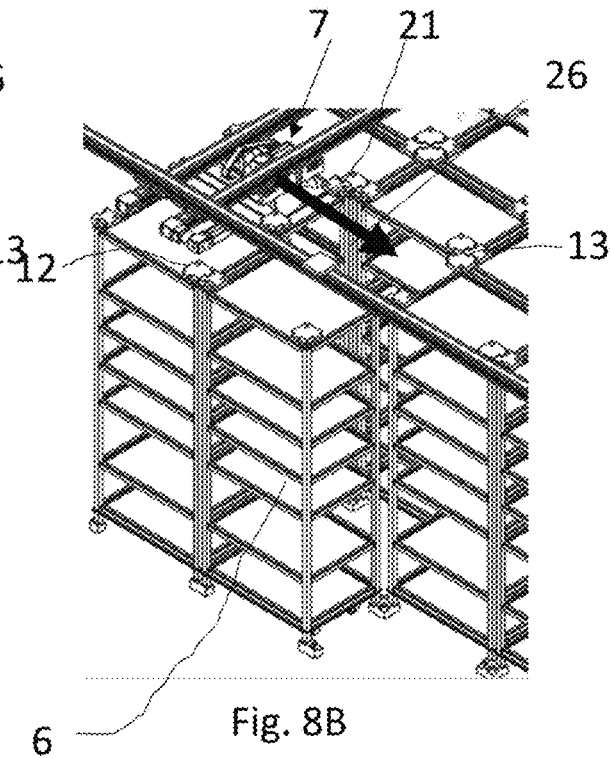

The rack 6 in the lifting position is subsequently transferred into the free rack spot 26 by the movement device 7. The securing geometries 13 of the surrounding racks 6 are thereby at the height of the notch 23, so that the securing geometries 13 of the racks 6 of the securing position do not collide with the rack 6 in the lifting position. This is illustrated in FIG. 8B.

Figure 8C:
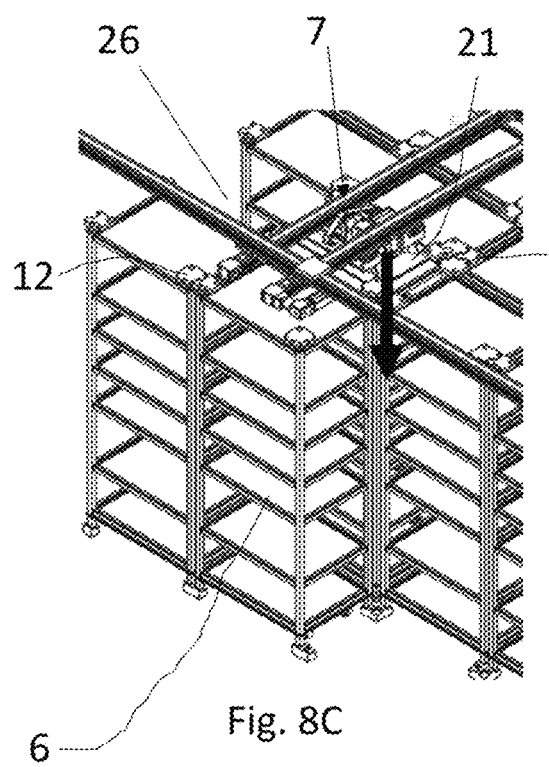

In FIG. 8C, the way in which the rack 6 is transferred from the lifting position into a securing position is illustrated. For this purpose, the lifting unit 8 lowers the lifting geometry 21, and thus the rack 6, in combination with the receiving geometries 12. The rack 6 is then located on the formerly free rack spot. The free rack spot and the relocated rack 6 have thus switched spots.

Figure 8D:
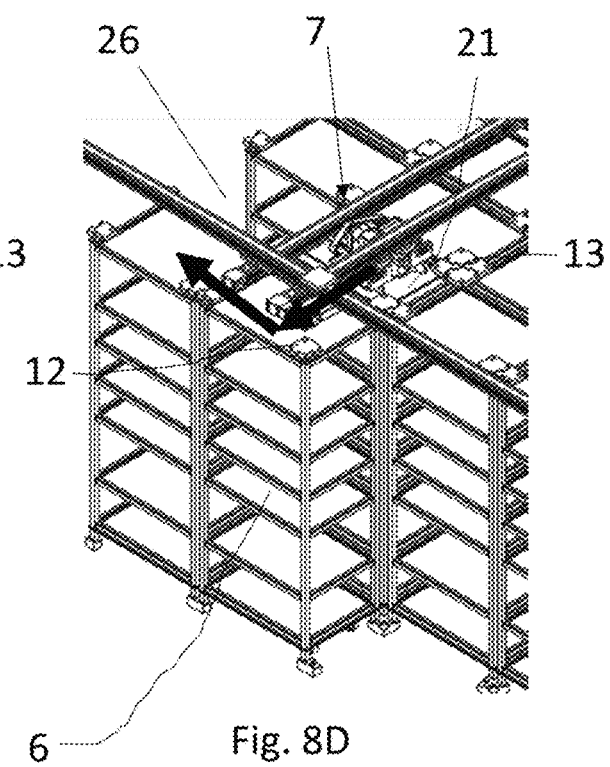

The lifting unit 8 can then proceed further and relocate a rack 6 that is now arranged adjacent to the new free rack spot 26. This is illustrated in FIG. 8D.

Figure 9:
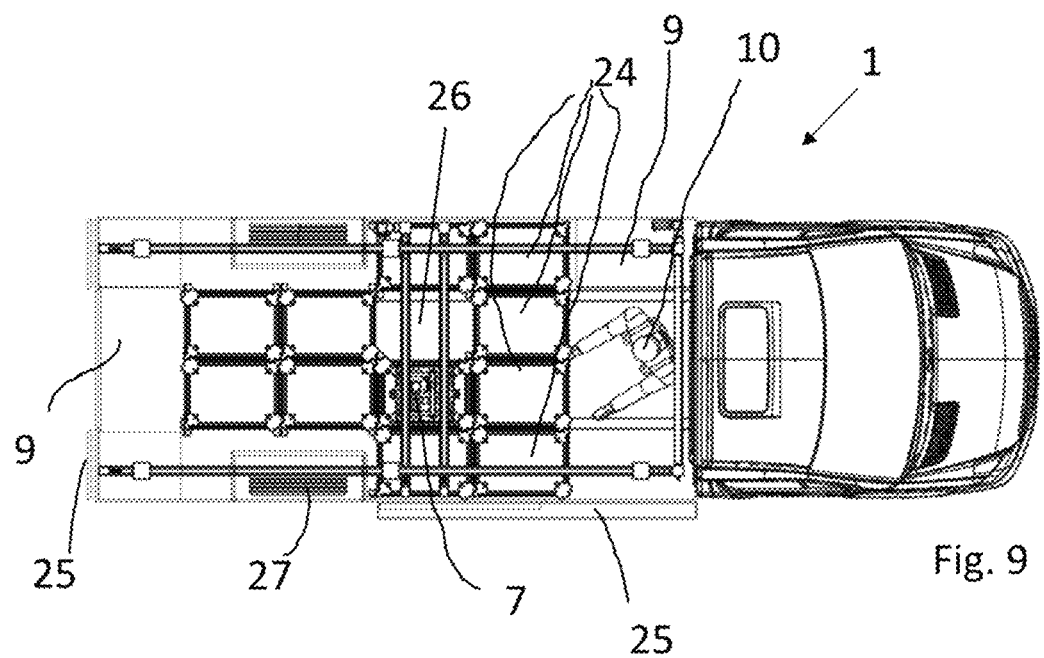
FIG. 9 shows a top view of a delivery vehicle with the storage arrangement.

In FIG. 9, an exemplary integration of the storage system in the vehicle 1 is illustrated. The service space 11 is arranged between the driver's cab 2 and the rack receiving space 5. Furthermore, a manual storage spot system 9 can be arranged in the service space 11. From the service space 11, the driver 10 can furthermore access multiple racks 6. These racks 6 are located in a removal position 24. The driver 10 can, through a laterally arranged door 25, exit the service space 11 to the outside or enter the service space 11 from the outside.

Furthermore, the implementing sliding storage system [being implemented] is illustrated in FIG. 9. The rack receiving space 5 comprises a free rack parking spot 26. An adjacent rack 6 can be relocated into this free rack parking spot 26. In this manner, the positions of the individual racks 6 can be changed in succession.

In the rear region of the transport space 3, an additional manual storage spot system 9 can be arranged. This manual storage spot system 9 is accessible from the outside through an additional door 25.

Figure 10:
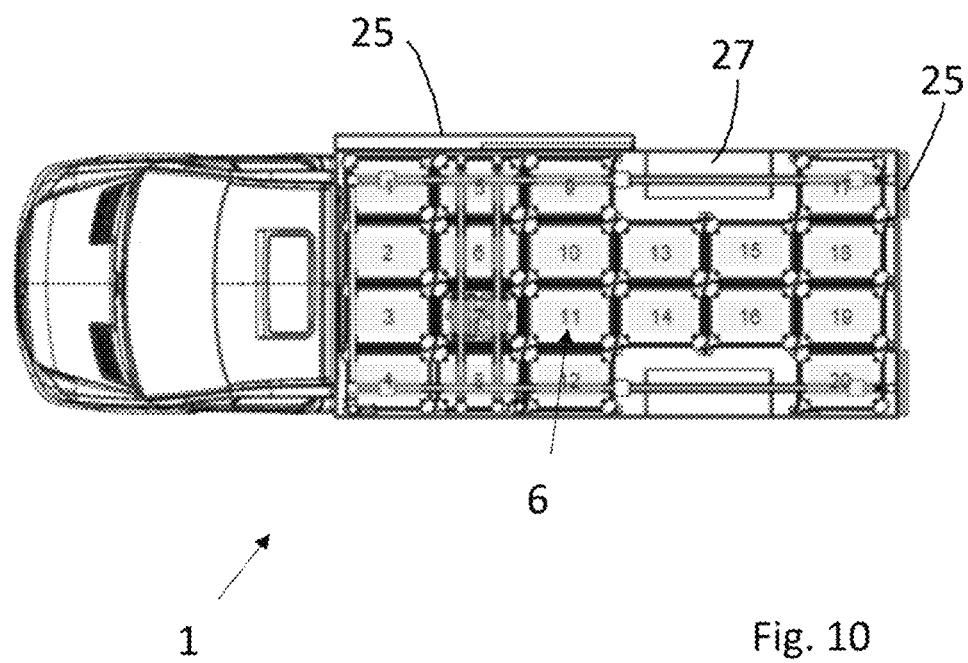
FIG. 10 shows a further embodiment of the storage arrangement in a delivery vehicle.

FIG. 10 shows a further implementation possibility of the storage arrangement in a vehicle 1. The rack receiving space 5 thereby fills the entire transport space 3 of the vehicle 1. Here, no rack spots are provided in the region of the wheel wells 27. This is the case if the wheel wells 27 protrude into the transport space 3. If no wheel wells 27 protrude into the transport space 3, additional rack spots can be provided in these locations.

Below, the functioning of the storage arrangement will now be described on the basis of the illustrated vehicle 1 within the scope of a parcel delivery. At a starting station, for example a parcel center, racks 6 are loaded with parcels to be delivered. For this purpose, both the parcel and also the rack 6 can be identified by a corresponding barcode, wherein the parcel is assigned to a corresponding rack 6. The racks 6 loaded with parcels are grouped together for a particular route and are ready for pickup by the driver 10 and his vehicle 1.

At the start of his shift, the driver 10 drives his vehicle 1 to a loading station of the parcel center in order to transfer the racks 6 prepared for him into the rack receiving space 5. To do so, the driver 10 pushes the rack 6 into the transfer position within the rack receiving space 5. From there, the movement device 7 takes over the rack 6 on the designated receiving geometries 12.

Inside of the rack receiving space 5, the movement device 7 moves the rack 6 to a designated position. At this position, the movement device 7 puts down the rack 6 so that securing geometries 13 interact with holding geometries, not illustrated, of the boundary of the rack receiving space 5. Furthermore, the rack 6 is inserted into securing devices 16 provided on a floor of the rack receiving space 5.

In the intervening time, the driver 10 can transfer another rack 6 to the transfer position.

Once the movement device has transferred the rack 6 that was placed into storage first to the target position thereof, the movement device 7 puts the rack 6 down. Then, the movement device 7 moves the to the rack 6 now located in the transfer position. There, the lifting unit 8 lists the rack 6 and moves it to a predetermined position. This position is, for example, adjacent to the rack 6 that was placed into storage first. After arriving in this position, the movement device puts the rack down such that the securing geometries 13 of the two racks 6, the rack placed into storage first and the second rack 6 placed into storage, interact with one another. The driver 10 can then transfer additional racks 6 into the rack receiving space 5 in the same manner.

The order of the loading of the racks 6 does not matter, since they are sorted or arranged by the movement device 7 during a trip to the various destination points. Racks 6 with parcels that are delivered first can thereby also be transferred into a removal position by the movement device 7.

The rack receiving space 5 thereby holds a maximum number of racks 6, wherein one rack spot 26 must be kept free for the sliding storage system.

Once all racks 6 have then been transferred into the rack receiving system 5, the driver 10 can start his trip. On the way to the first destination, the racks 6 are sorted such that the driver 10 can access the parcel that is to be delivered. For this purpose, the corresponding rack 6 is transferred into a removal position 24. From the service space 11, the driver 10 can access the rack compartments of a rack 6 that is located in a removal position. The driver 10 thus removes the parcel that is to be delivered and hands it over to a receiver. The driver then drives to the next destination.

In the intervening time, between the departure from the first destination to the arrival at the second destination, the racks 6 are sorted in the rack receiving space 5 such that the driver 10 has access to the next parcel that is to be delivered. The corresponding rack 6 is also transferred into a removal position 24 for this purpose.

This procedure is repeated until the driver 10 has delivered all parcels, or until his trip is finished. The driver 10 then drives back to the starting point.

After arrival at the parcel center, the movement device transfers one rack 6 after the other to the transfer position, from which the driver 10 can remove the rack 6 from the rack receiving space 5.

While the racks 6 are arranged in the rack receiving space 5, adjacent racks 6 secure one another reciprocally with the securing geometries 13. Each rack 6 thus remains in its inherited position until it is lifted and moved by the movement device 7. An inadvertent shifting or movement of the racks 6 can thus be avoided. Through [sic] the interaction of the racks 6 with the movement device arranged thereabove in the direction of gravity furthermore permits a quick and easy re-sorting of the racks 6 in the rack receiving space 5.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Vehicle
2 Driver's cab
3 Transport space
4 Movement space
5 Rack receiving space
6 Rack
7 Movement device
8 Lifting unit
9 Manual storage spot system
10 Driver
11 Service space
12 Receiving geometry
13 Securing geometry
13A Projection
13B Recess
14 Column
15 Rack compartment
16 Securing device
17 Caster
18 Locating geometry
19 First linear axis
20 Second linear axis
21 Lifting geometry
22 Seeking geometry
23 Notch
24 Removal position
25 Door
26 Free rack spot
27 Wheel well

What is claimed:

1. A storage arrangement comprising:
a rack receiving space; and
a movement space,
wherein the rack receiving space comprises at least one movable rack and the movement space contains a movement device which interacts with the at least one rack,
wherein the movement space is arranged above the rack receiving space in a direction of gravity,
wherein the movement device is releasably engaged with the at least one rack, wherein the movement device comprises a positively guided lifting unit movable along two movement axes arranged at an angle to one another, and wherein the lifting unit is movable perpendicularly to the two movement axes, wherein the at least one rack comprises a receiving geometry which releasably interacts with a lifting geometry of the lifting unit of the movement device, and wherein the receiving geometry comprises a first securing geometry arranged outwardly from the rack, the first securing geometry being releasably engaged with a second securing geometry of a receiving geometry of an adjacent rack in a securing position.

2. The storage arrangement according to claim 1, wherein: the two movement axes are arranged at essentially right angles to each other.

3. The storage arrangement according to claim 1, wherein: the lifting geometry is movable beneath the receiving geometry in the direction of gravity.

4. The storage ran men according to claim 1, wherein: the lifting geometry comprises a seeking geometry and the receiving geometry comprises a locating geometry.

5. The storage arrangement according to claim 4, wherein: at least a boundary of the rack receiving space is configured to comprise at least one holding geometry that interacts with a securing geometry of the at least one rack.

6. The storage arrangement according to claim 4, wherein: in a lifting position in which the rack has been lifted by the lifting unit, a first securing geometry of the rack is movable past at least one of a second securing geometry and a second receiving geometry of a second rack in a securing position.

7. The storage arrangement according to claim 1, wherein: the at least one rack has a rectangular layout with a length direction and a width direction, wherein a column is provided in each corner region, with the receiving geometry being arranged on at least one of the columns in an upper region thereof in the direction of gravity.

8. The storage arrangement according to claim 7, wherein: the receiving geometry extends in at least one of the length direction and the width direction towards an adjacent column.

9. The storage arrangement according to claim 8, wherein: the receiving geometry extends essentially towards a middle of the rack.

10. The storage arrangement according to claim 1, wherein: a portion of the lifting geometry overlaps a portion of the receiving geometry of the at least one rack in a lifting position.

11. The storage arrangement according to claim 1, wherein: the lifting geometry is movable between two adjacent columns of an at least one rack in a securing position.

12. The storage arrangement according to claim 1, wherein: a floor of the rack receiving space comprises at least one securing device for the at least one rack.

13. The storage arrangement according to claim 1, wherein: the lifting unit is movable on linear axes.

14. The storage arrangement according to claim 1, wherein: the storage arrangement is mobile.

* * * * *